Jan. 3, 1956

C. E. MILLER 2,728,974

AUTOMATIC LATHE

Filed Aug. 24, 1950

Inventor
Carroll E. Miller
by
Wright Brown Quinby & May
Attys.

Jan. 3, 1956 C. E. MILLER 2,728,974
AUTOMATIC LATHE
Filed Aug. 24, 1950 10 Sheets-Sheet 2

Fig. 2.

Inventor
Carroll E. Miller
by
Wright, Brown, Quinby & May.
Attys.

Jan. 3, 1956     C. E. MILLER     2,728,974
AUTOMATIC LATHE Filed Aug. 24, 1950     10 Sheets-Sheet 10

Inventor
Carroll E. Miller
by Wright Brown Quinby & May
Attys.

2,728,974
Patented Jan. 3, 1956

United States Patent Office

2,728,974
AUTOMATIC LATHE

Carroll E. Miller, Windsor, Vt., assignor to Cone Automatic Machine Company Inc., Windsor, Vt., a corporation of Vermont Application August 24, 1950, Serial No. 181,287

7 Claims. (Cl. 29—43)

This invention relates to automatic lathes and has for one object to provide increased flexibility of control of the various tooling operations by which the rate of feed of each tool may be controlled radially independently of each of the other tools and by which proper timing and coordination between the several operations may be secured readily and adjustably as may be desired.

This invention is illustrated herein as applied to a single spindle lathe provided with a plurality of tool carriers for tools which may approach a work piece carried by the spindle from various directions substantially perpendicular to its axis of rotation, and also provided with a plurality of end working tools which may be caused to operate in predetermined sequence and in adjustably timed relation to the first mentioned tools.

A further object is to provide for special tooling operations for the end working tools such as necking or grooving.

Further objects and advantages will appear from a description of an embodiment of the invention shown in the accompanying drawings in which.

Referring first to Figures 1, 2, 3 and 4, the machine comprises a lower base 1, an upper base 2, a headstock column 3 joining the upper and lower bases at the headstock end of the machine, and a tailstock column 4 at the opposite end of the machine supporting the tailstock end of the upper base 2 from the lower base 1. Journaled in the headstock column 3 is the work spindle 5 (see also Figure 15) which may carry on its inner end a suitable chuck 6 from which may protrude the end of a piece of stock S which is to be tooled.

Figure 1:
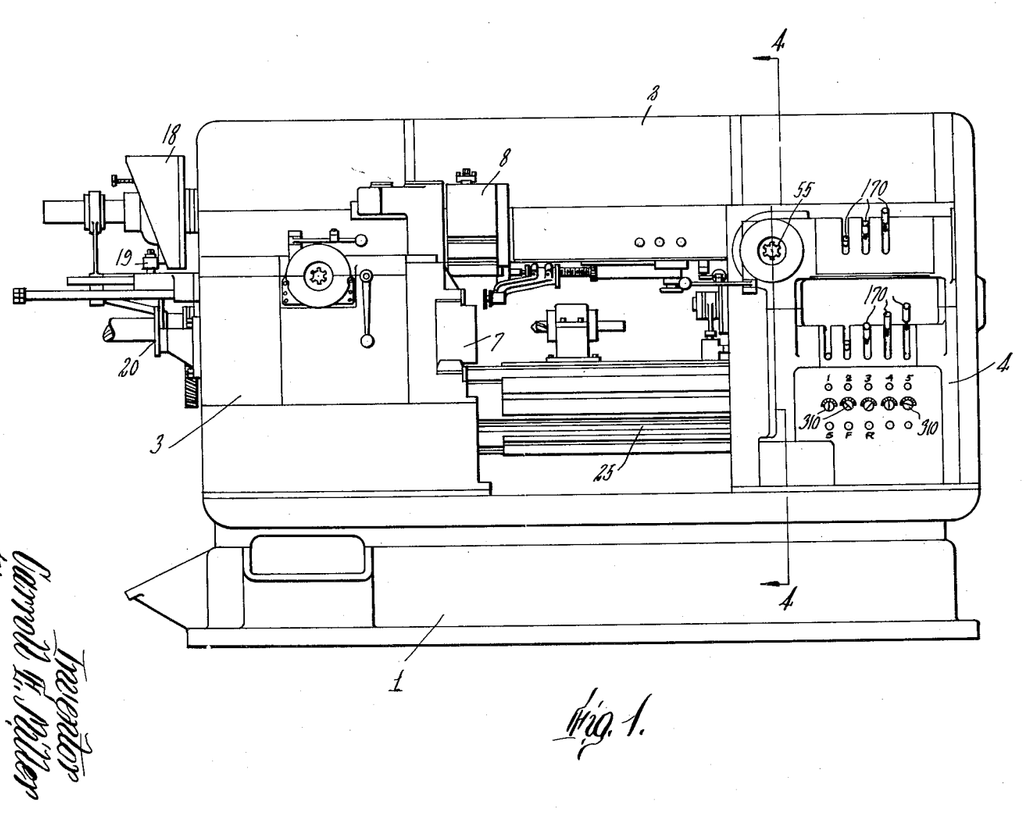
Figure 1 is a front elevation of a single spindle lathe embodying the invention.
Figure 2:
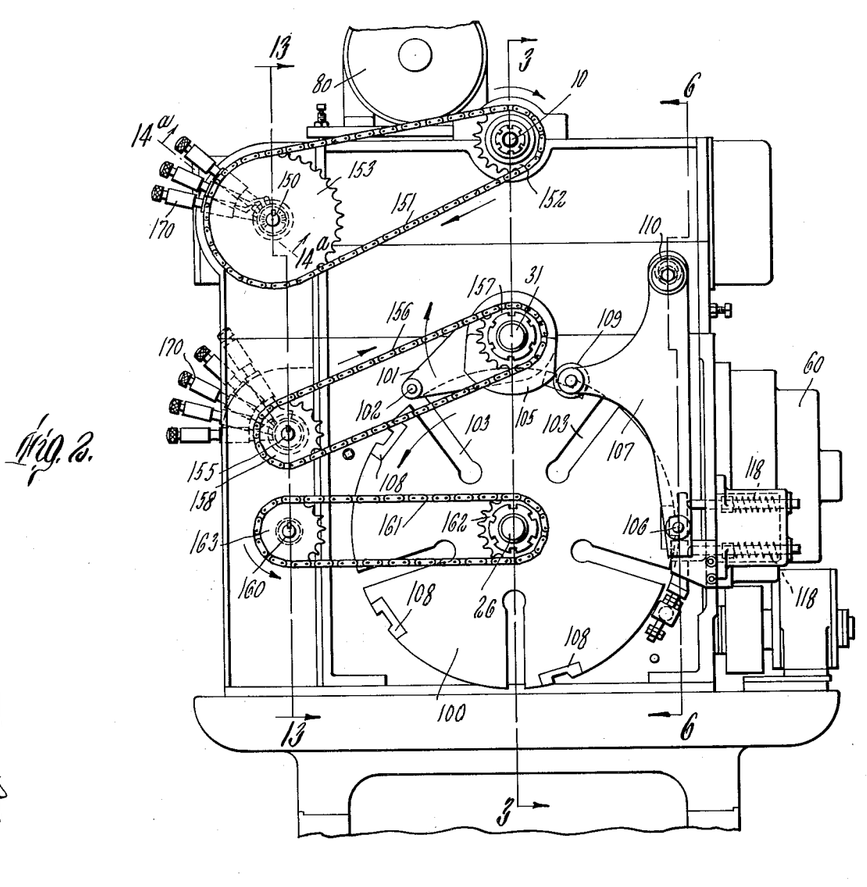
Figure 2 is a right hand end elevation of the upper portion of the machine with the end cover removed.
Figure 18:
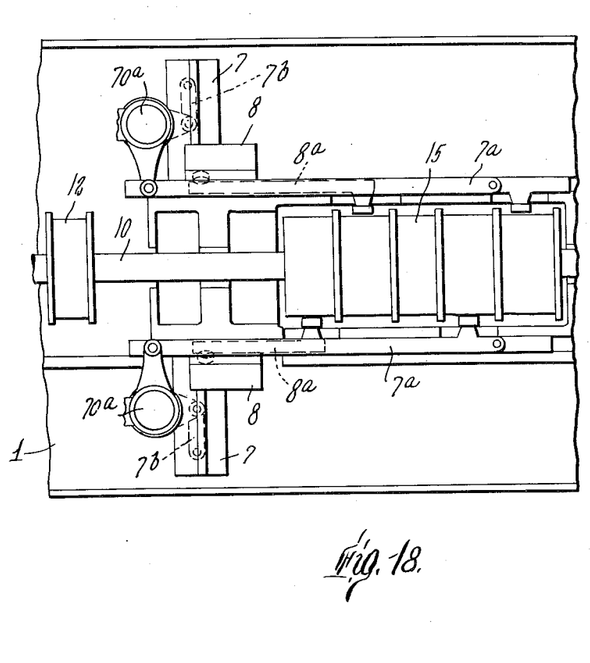
Figure 18 is a top plan view of the parts shown in Figure 17.

At 7 and 8 in Figures 1 and 18 are shown lower and upper cross slides which may carry tools for operating on the work piece S. The lower cross slide 7 moves substantially horizontally while the slide 8 moves downwardly and inwardly to bring the tools on these slides toward the work piece S. It will be understood that there may be similar slides 7 and 8 moving in toward the work piece from the back side of the machine.

Within the upper bed 2 and arranged parallel with the spindle 6 is a cam shaft 10 having a pair of cam drums 11 and 12 and a plurality of drums arranged together at 15. The cam drum 11 carries suitable cams for actuating a slide 16 through follower 17, this slide 16 being operatively related to an axially movable clutch actuating spool 14. A cam 18, also carried by the shaft 10, serves to actuate a follower 19 which actuates a stock feed device at 20. These various stock controlling mechanisms may be of any suitable type as per se they form no part of the present invention.

Figure 17:
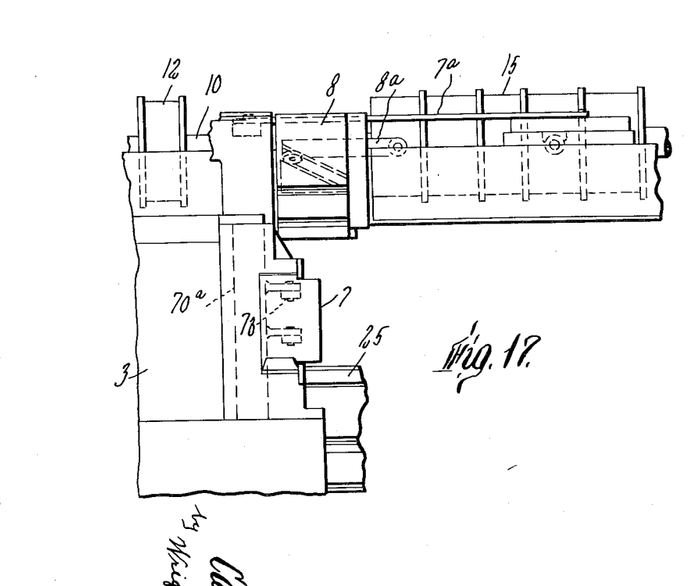
Figure 17 is a fragmentary side elevation of the machine, the cover for the upper base having been removed.

The cam drum 12 and the cam drums 15 have suitable cams thereon for actuating and controlling other functions of the machine such as the motions of the front and back and inclined tool slides 7 and 8, which are controlled by cams on the two left hand cam drums and the two right hand cam drums, respectively. The slides 7 and 8 may be actuated through follower-carrying bars 7a and 8a, respectively, as shown in Figures 17 and 18. The bars 7a actuate vertical rock shafts 70a connected to the slides 7 through links 7b, and the bars 8a have cam rolls riding in inclined slots in the slides 8. Cam 12 controls the high speed and reverse clutches for controlling the speed and the direction of rotation of the cam shaft 10 as is usual in machines of this type. The stock stop is operated by cams on the central section of the drum 15. All this mechanism per se may be as shown in my Patent No. 2,506,515 for Automatic Lathe or Screw Machine granted May 2, 1950.

The cam shaft 10 is arranged to be driven at two different speeds, the faster rate of speed being employed during the time that the two front and rear tool carriers are being moved up toward the work piece and when they are being moved to retract from the work piece. The lower speed drive is employed for the feed motions of the various tool slides when they are in engagement with the work piece and when they are moving from the end of the high speed drive to actual contact of the tools on the work during the inward motions of the tool slides. Rotation of the shaft 10 is produced by rotation of a cross shaft 21. The spindle 5 is driven as by a suitable motor M in the usual manner through a gear train indicated generally at 22 in Figure 15, and which may be the same as in my Patent No. 2,506,515 hereinbefore noted.

The end working tools are arranged on an indexing turret 25 carried by a shaft 26 which extends from end to end of the machine and is arranged below and parallel to the work spindle 5. The turret 25 is provided with a plurality of longitudinal grooves or ways 27 therein, five grooves or ways being shown in Figure 4 arranged equiangularly spaced around its axis. These end working tools are arranged to slide in these ways. Such motion provides, for example, for feed and retracting motions of drills, threading tools, and the like, independently of each other. The turret is indexed to bring the several tools in the ways in succession into operative relation to the work piece.

The axial motion of the several tools is produced by rotation of a cam drum 30 fixed to a shaft 31 journaled in the tail end column 4 above the shaft 26 and parallel to this shaft and to the work spindle.

Figure 3:
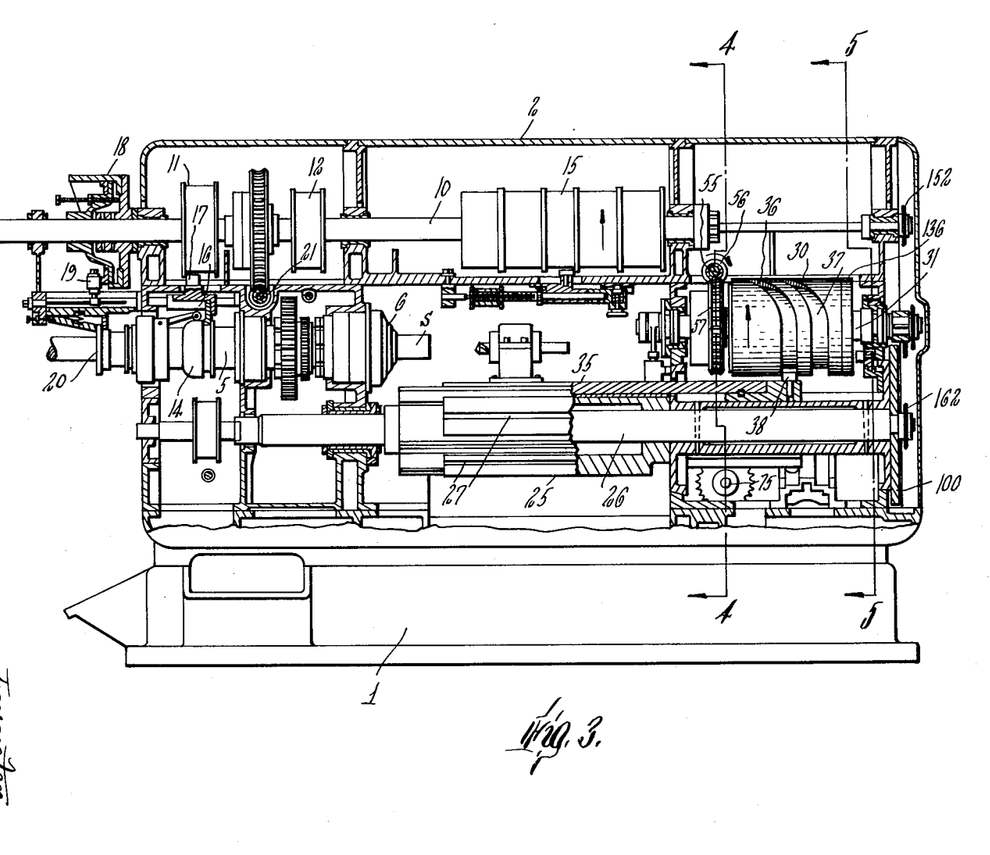
Figure 3 is a vertical longitudinal sectional view on line 3—3 of Figure 2.

Each of the end working tools, such as the drill shown in Figure 3, is carried by a slide 35 to which it may be secured in any desired lengthwise position. This cam drum 30 has two cam grooves 36 and 37 cut in its periphery, the front one 36 being employed for certain end working tools, while the rear one 37 operates a tool slide when it is used for necking or undercutting.

Figures 7, 8, 9, 10, 11:
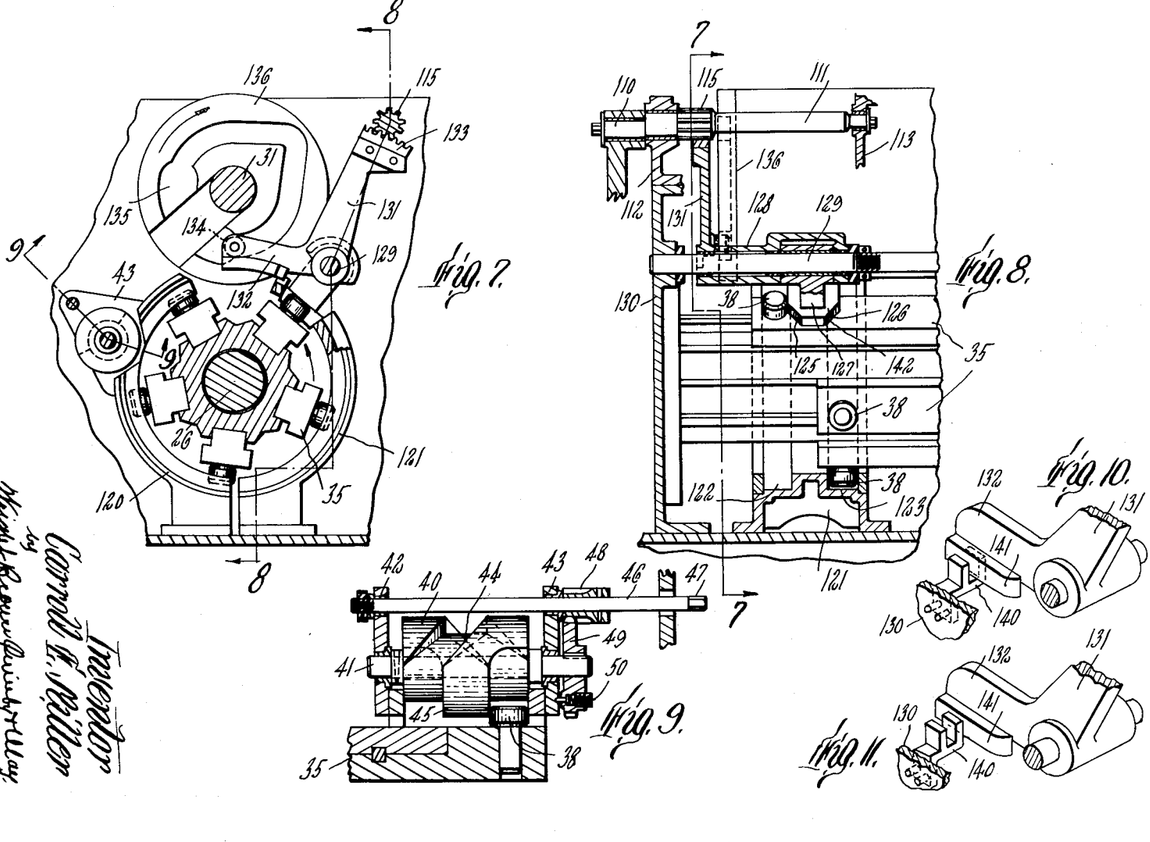
Figure 7 is a detail sectional view on line 7—7 of Figure 8.
Figures 8 and 9 are detail sectional views on lines 8—8 and 9—9, respectively, of Figure 7, section line 9—9 also appearing on Figure 5 in which the parts are shown to a smaller scale.
Figures 10 and 11 are fragmentary perspective views of certain parts in different relative positions.

Means are provided for moving one of the cam followers 38 carried by a tool slide 35 into position to be controlled by one or the other of these grooves while this cam slide is out of angular position to register with the grooves in the drum 30, the slide being thus movable transverse to its tooling and retracting motions as the turret is indexed. As shown best in Figures 7 and 9, this is accomplished by the manual turning of a shifter cam 40 carried by a shaft 41 journaled in end wall members 42 and 43. This cam 40 is provided with a double spiral cam groove 44, the two portions of which are on opposite sides of a central shoulder 45 positioned to be engaged on one or the other side of the follower 38, depending on which side it happens to be in when the turret 25 is indexed to bring a follower 38 into operative relation to the cam drum 40 as shown in Figure 9. When in this position, if the cam drum 40 be rotated through a complete revolution, the cam groove 44 guides the follower 38 into its opposite axial position, in one of which axial positions it is in line with the controlling cam groove 36, and in the other of which positions it is in alinement with the cam groove 37 whenever by indexing of the turret it is brought into engagement therein. The rotation of this cam 40 may be accomplished by rotating the shaft 46 by engaging a wrench with one end thereof at 47, this shaft 46 carrying a pinion 48 meshing with a gear 49 secured to the shaft 41 of the cam drum 40. A spring pressed detent at 50 releasably holds the drum 40 in proper angular position between the times that it is employed to move the cam follower 38 from one of the other of its positions.

Figure 4:
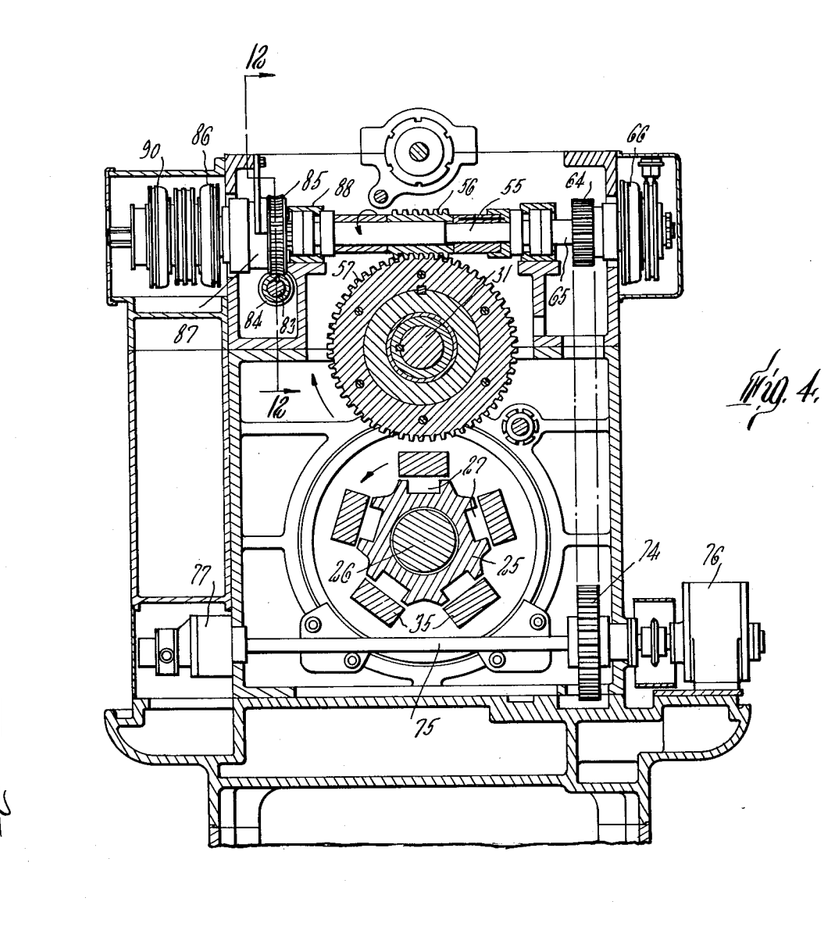
Figures 4 and 5 are vertical transverse sectional views on lines 4—4 and 5—5, respectively, of Figure 3, section line 4—4 also appearing on Figure 1 and section line 5—5 also appearing on Figure 6.
Figure 5:
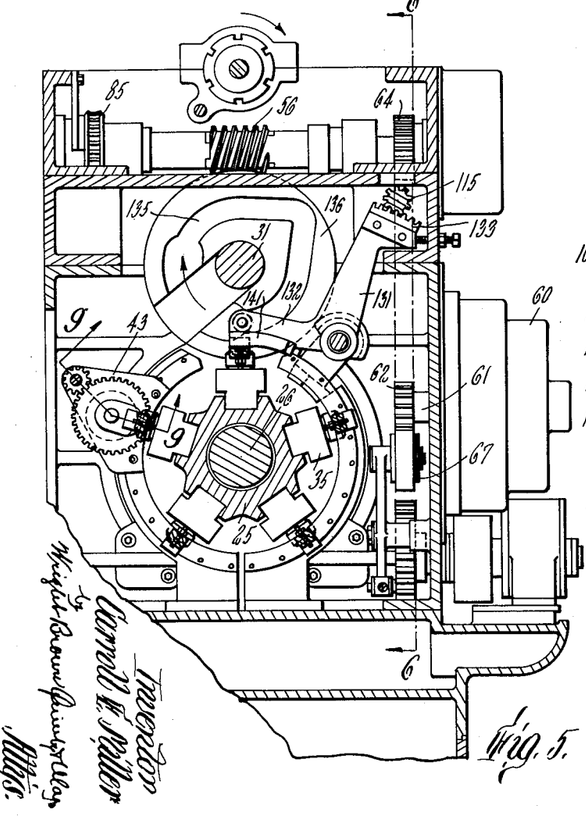
Figure 6:
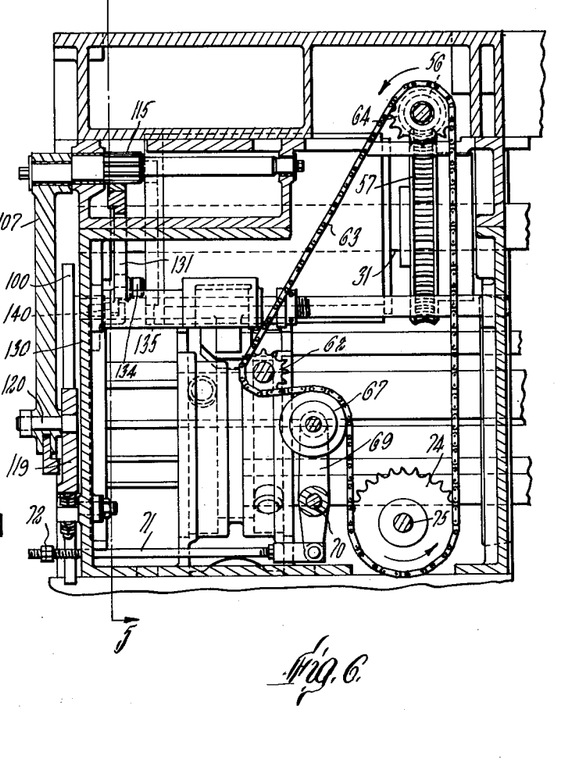
Figure 6 is a vertical sectional view on line 6—6 of Figure 5.
Figure 15:
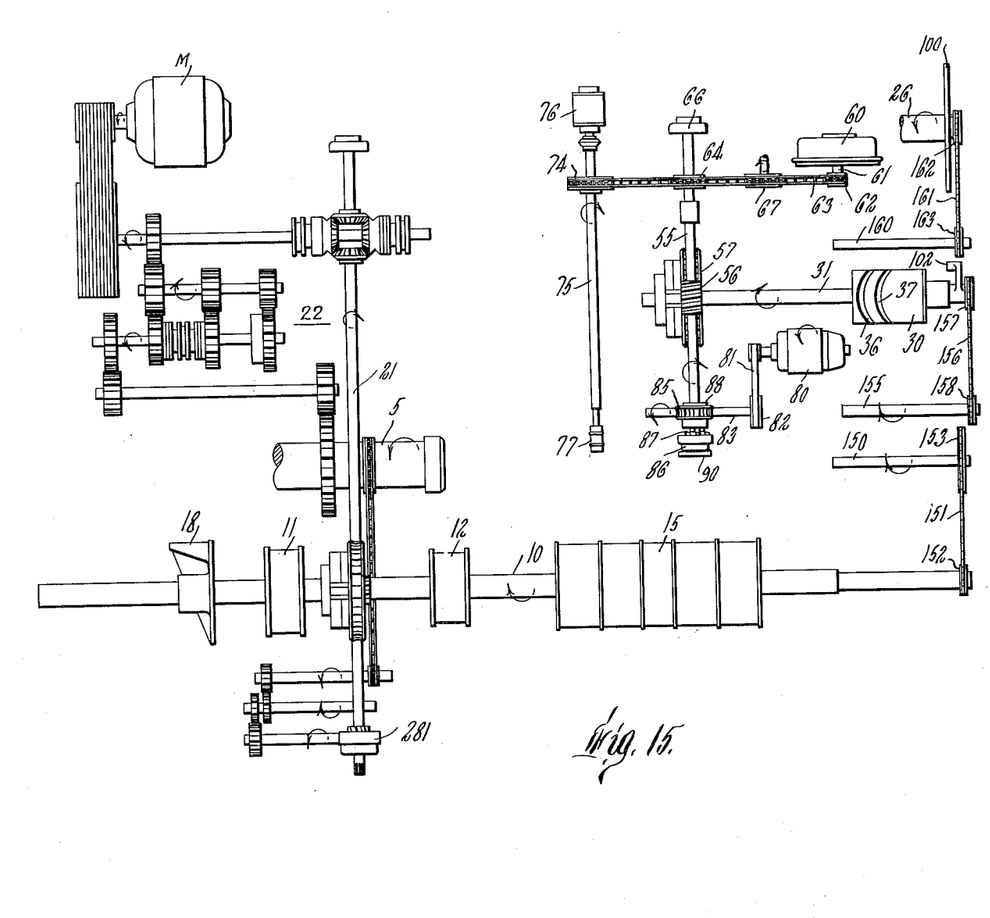
Figure 15 is a diagrammatic view of the driving mechanism.

The cam drum 30 which controls the axial motions of the end working tool slides, when they are brought serially into controlled position thereby, is rotated by a worm shaft 55 having a worm 56 thereon meshing with a worm gear 57 secured to the shaft 31 on which the cam drum 30 is secured (Figures 4 and 15). This worm 56, as shown best in Figure 4, is arranged to be rotated at either of two speeds by rotation of its shaft 55. The high speed rotation is derived from a constantly running motor 60 shown best in Figures 2, 5, 6 and 15. This motor is provided with a shaft 61 carrying a chain pinion 62. A chain 63 passes about this pinion 62 and around a sprocket gear 64 on a sleeve 65 journaled on the shaft 55 and adapted to be clutched thereto through a magnetic clutch at 66. The chain 63 also passes around an idler sprocket 67 carried at the upper end of a lever 69 fulcrumed on a shaft 70 and angularly adjustable by means of a link 71 pivoted to its lower end and adjustable and locked in adjusted position by lock nuts 72. Chain 63 also passes around a sprocket wheel 74 carried by a shaft 75 which is the drive shaft for a cutting fluid pump 76 (see Figure 4) and a lubricating pump 77. This high speed drive is employed during the time that the turret is being indexed and during the time that the tools carried thereby are being retracted from the work or are being moved up toward the work preparatory to a cutting operation.

Figures 12, 13, 14, 14A:
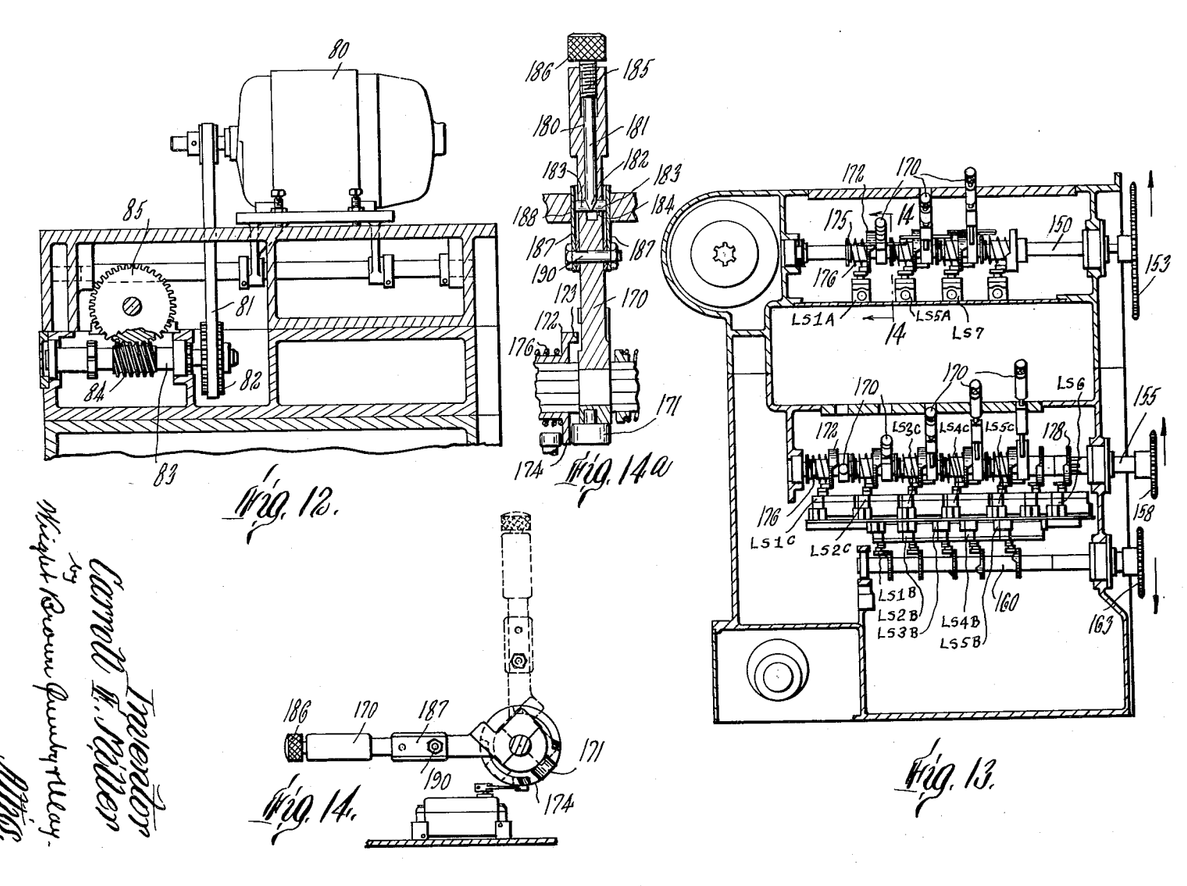
Figure 12 is a detail sectional view on line 12—12 of Figure 14.
Figure 13 is a vertical sectional view on line 13—13 of Figure 2.
Figure 14 is a detail sectional view to a larger scale on line 14—14 of Figure 13.
Figure 14a is a detail sectional view on line 14a—14a of Figure 2.

A low speed drive is employed for the working stroke of the tools, and this low speed drive is produced by a third motor 80 which is shown in Figures 12 and 15 as connected through a driving belt 81 with a pulley 82 carried by a worm shaft 83. This shaft 83 carries a worm 84 which meshes with a worm wheel 85 on a sleeve 88 journaled on the worm shaft 55 and adapted to be clutched thereto by an electric clutch 86. An overrunning clutch 87 permits the high speed drive to take over when the clutch 66 is closed.

An electric brake 90 acts to slow the rotation of the worm shaft 55 whenever the high speed clutch 66 is deenergized so that the worm shaft 55 slows down to the slow speed drive rate quickly. This brake may be energized for a predetermined length of time and then deenergized by means well known in the art. The motor 80 which affords the slow speed drive for the cam drum 30 operates only when slow speed is desired and is controlled automatically by means which will later appear.

The tool turret 25 has secured to its outer or right hand end as viewed in Figure 3, an indexing plate 100 and this whole assembly is indexed by the arm 101 (see Figure 2) carried by the cam drum shaft 31. The arm 101 carries a follower 102 which may enter into indexing slots 103 in the indexing plate 100 and cause the indexing of this plate, and as shown one-fifth of a revolution at each complete rotation of the arm 101. This corresponds to the five tool slides carried by the turret. This shaft 31 carries a cam plate 105 which operates the locking pin 106 carried by an arm 107 and which engages successively in the locking recesses 108 in the indexing plate 100. The lower portion of the arm 107 with the locking pin 106 is normally held pressed toward the periphery of the indexing plate 100 as by spring pressed pins 118 engaging a plate 119 pivoted on the pivot pin 120, at the lower end of the indexing arm 107 (see Figure 6). The arm 107 carries a follower 109 with which the cam plate 105 engages, this cam plate being fixed to rotate with the shaft 31.

The upper end of the locking arm 107 is fulcrumed on an eccentric 110 (see Figure 8) on a shaft 111, which is journaled in two spaced stationary frame members 112 and 113. Between these two frame members the shaft 111 carries a pinion 115. By rocking this pinion 115 it will be evident that the shaft 111 may be rocked, thus causing alternate lifting and lowering of the fulcrum eccentric 110 of the locking arm 107, which, through its engagement with the locking pin 106, causes a rocking motion of the indexing plate 100 which produces a lateral motion to the tool then in operative engagement with the work piece. This effects an undercutting or necking of the work and it is accomplished, as will be described.

The followers 38 for the various tool slides 35 after being positioned as desired as by the action of the cam 40 into lateral alinement with either of the two cam grooves 36 and 37, are guided throughout the indexing action of the turret to remain in alinement with the same groves by two arcuate guide members 120 and 121, shown best in Figures 7 and 8, each of these guide members having spaced arcuate ways 122 and 123. The arcuate ways 123 aline the followers 38 so that they enter the cam groove 36 when they reach the index station to cooperate with the cam 30 and no necking or undercutting occurs when the cam follower 38 is in engagement with the groove 36. When a cam follower 38 is in the guide groove 122, however, so that it is directed into the groove 37 of the actuating cam 30, this follower 38 when it approaches the station next preceding the tooling station, engages the outer inclined face 125 of a shoe 126 (see particularly Figure 8). This shoe 126 is carried by an arm 127 which projects from a sleeve 128 slidable on a shaft 129 fixed in the frame member 130. This sleeve 128 carries a pair of arms 131 and 132. The arm 131 carries a rack segment 133 at its outer end which meshes with the pinion 115, this segment 133 being thus axially slidable while maintaining contact with the pinion 115. The other arm 132 carries a cam follower roll 134, which, when the sleeve 128 is moved inwardly, is moved into a cam groove 135 in a cam 136. This cam 136 is carried by the shaft 31 which carries the cam 30. The cam groove 135 is so formed that when the cam 30 is rotated, it causes a rocking motion of the arms 132 and 131 with a consequent oscillatory motion of the shaft 111 and a rocking of the tool carrying turret.

The cam follower 134 is maintained in axial position to engage the cam groove 135 when it is once moved thereinto, by a forked bracket 140 (see Figures 10 and 11) carried by the frame member 130, a guide shoe 141 carried by the double arm mechanism comprising the arms 131 and 132 engaging either between the forks, as shown in Figure 10, or inwardly of both as shown in Figure 11. In its inward position of Figure 11, the cam follower 134 is maintained within the cam groove 135, while in the position of Figure 10, it is held out of this groove corresponding to the outward position of the sleeve 128 to which it is returned by a succeeding cam follower 38 of a tool slide positioned in the guide groove 123 engaging a second inclined cam face 142 of the shoe 125 as shown in Figure 8. It will thus be seen that whenever one of the tool slide followers 38 is arranged to cooperate with the cam groove 36 of its actuating cam 30, no undercutting or necking action of the tool is produced, while when it is adjusted to engage in the actuating cam groove 37, such necking or undercutting is produced by causing a rocking of the tool turret while the tool is in engagement with the work piece and inwardly of its outer end. This undercutting by rocking of the tool turret is not claimed herein but forms subject matter of my application for Letters Patent Serial No. 58,074, filed November 3, 1948, for Single Spindle Automatic Lathe.

Means are provided in accordance with this invention for controlling the speed of motion of the end working tools independently for each such tool and for initiating their time of actuation independently of each other.

Means are also provided for adjusting the timed relation between the end working tools and the front and back tool slide actuations.

Means are also provided for independently adjusting the point at which slow feed of the turret slide tools begins.

Figure 16:
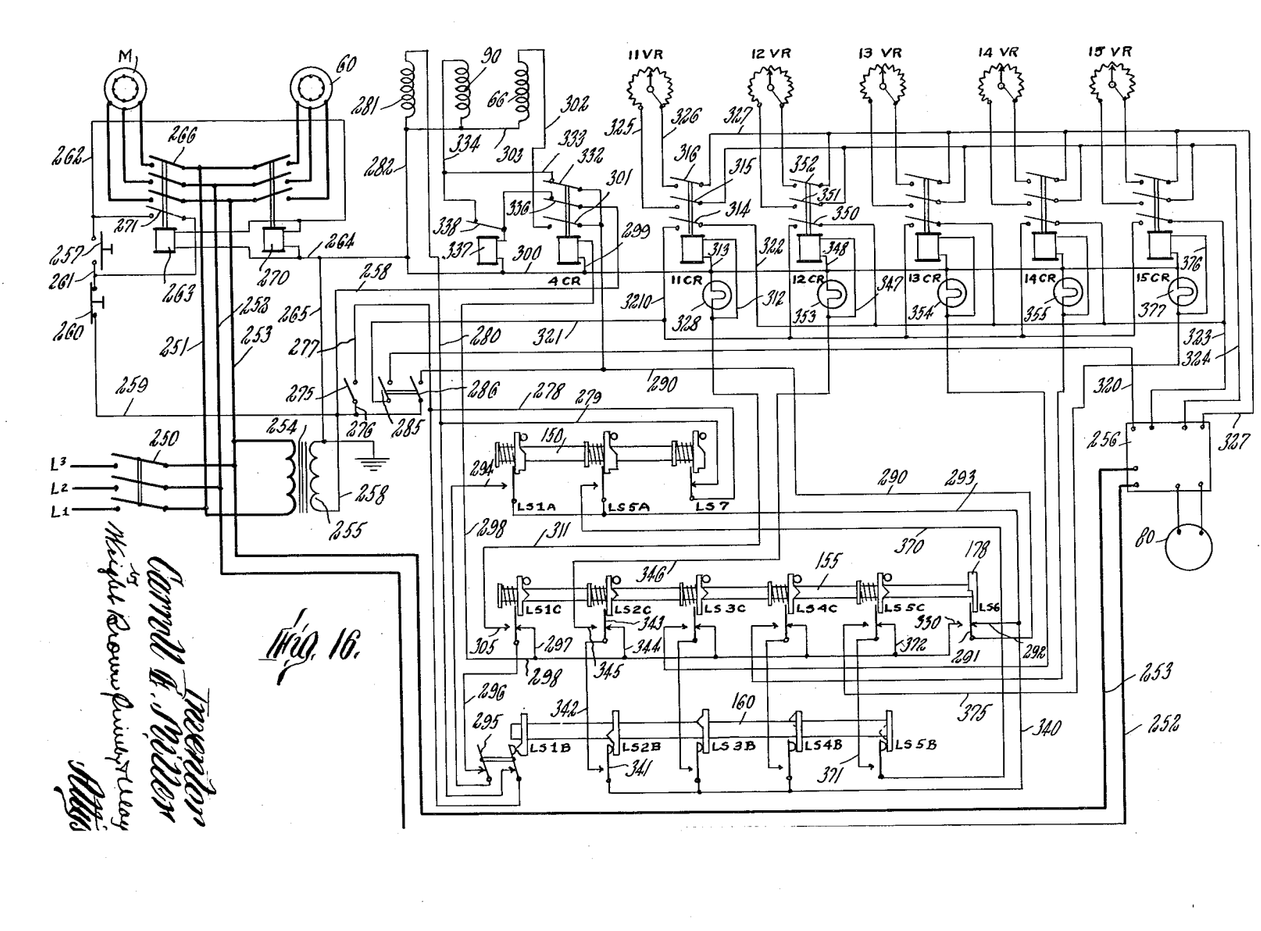
Figure 16 is a much simplified wiring diagram of the electrical system of the machine.

The means for timing and controlling the speed and feed time of these tools are shown best in Figures 1, 2, and 13 to 16, inclusive, it being understood, however, that Figure 16 which shows a wiring diagram, is much simplified, there being on the actual machine many additional controls possible by the use of more complicated circuit arrangements. The tool slide timing is accomplished by the rotation of a shaft 150 (see Figures 2 and 15) which is shown as chain driven by the chain 151 from the cam shaft 10 which is provided with a sprocket wheel 152 for engagement by the chain 151. A sprocket wheel 153 is secured to the shaft 150 for engagement with the same chain 151. The shaft 150 controls the time of start of the fast inward motions of the turret slides and stops the rotation of the cam shaft in case the turret tools should not have completed their cycles prior to completion of the cycle of the tool carriers 7 and 8 both front and back. A shaft 155 controls the mechanism which determines the beginning of slow or working feed for the turret slides at individually adjustable rates for the several slides. This shaft 155 is driven from the shaft 31 by a chain 156, which passes about a sprocket wheel 157 fixed to the shaft 31 and a sprocket wheel 158 fixed to the shaft 155. A third shaft 160 is driven by a chain 161 from a sprocket wheel 162 fixed to the turret shaft 26, this chain 161 also engaging a sprocket wheel 163 carried by the shaft 160. This shaft controls the timing of certain operations with reference to the various index stations.

Each of the shafts 150 and 155 carries angularly adjustable thereon a plurality of levers 170, details of each of which are shown in Figures 14 and 14a. Each lever 170 carries a cam follower roll 171 for cooperation with a cam collar 172 keyed to its respective shaft and pressed axially of this shaft into contact with the follower roll 171 as by a coil spring 176 reacting at one end against the cam collar flange 174 and at its other end against a collar 175 fixed to the shaft. Each cam collar 172 has an axial projection or high portion 173 which when it engages the follower roll 171 wedges the cam collar axially away from the lever 170 and causes its flange 174 to actuate a limit switch. There are three such limit switches LS1A, LS5A and LS7 adjacent to the shaft 150 and five such switches LS1C to LS5C adjacent to the shaft 155. A limit switch LS6 is associated with an angularly fixed cam 178 carried by the shaft 155.

Each of the levers 170 may be fixed in any angular position into which it may have been placed. To this end, as shown in Figure 14a, it is provided with an axial bore 180 within which is slidably mounted a rod 181. The inner end of this rod is oppositely beveled as at 182 for engagement between mating beveled ends of a pair of plugs 183 laterally slidable in a bore 184 transverse to and intersecting the bore 180. The outer end of the bore 180 is enlarged and internally threaded for the reception of a screw 185 provided with a knurled head 186. The inner end of the screw 185 bears against the outer end of the rod 181 and by screwing inwardly, the rod 181 is forced between its plugs 183 which are thus wedged apart with their outer ends engaging spring clamp shoes 187, forcing them against the edges of a frame guide slot 188 within which each lever rides. Each pair of spring clamp shoes 187 is secured to its lever 170 as by a bolt and nut at 190. The timing of the actuation of the various limit switches is thus adjustable and independently for each by adjusting the angular position of the corresponding lever 170.

The shaft 160 carries five angularly fixed cams each having a high point arranged to close a limit switch LS1B, LS2B, LS3B, LS4B and LS5B at one of the five index positions of the turret, the number designations for each of these switches indicating the several turret positions.

The drive for the cam shaft 10 may be the same as that shown in my Patent No. 2,506,515 including high and low speed drives, the only exception being that in place of the hand actuated fast motion clutch 402 shown in Figure 7 of this patent, an electrically closed clutch 281 has been substituted.

Referring more particularly to Figure 16, power is supplied from the three-phase alternating power lines L1, L2, and L3 through the main switch 250, which, when closed, energizes the leads 251, 252 and 253. From the leads 251 and 253 the primary of a transformer 254 is energized, the various low voltage controls being energized from the secondary 255 of this transformer. The leads 252 and 253 also extend to control box 256 for the motor 80.

Upon closing of the button start switch 257, connection is made from one end of the transformer secondary 255 through leads 258, 259, closed stop switch 260, lead 261, closed start switch 257, lead 262, main switch-closing coil 263 and leads 264 and 265 back to the transformer secondary 255. This closes the main motor switch 266 connecting the motor M to the power leads 251, 252 and 253. The motor 60 is also started by energization of the switch-closing coil 270 which is connected in parallel with the coil 263 across the leads 262 and 264. At 271 is a holding circuit switch which by-passes the starting switch 257 thus to continue the operation of the main motor M and the rapid traverse motor 60 when the start button 257 is allowed to open. Depressing the stop button 260, however, will interrupt the circuit to both coils 263 and 270 and will stop both motors M and 60.

The rotation of the cam shaft 10 with consequent motion of the cross stool slides 7 and 8 is initiated by the operator closing the switch 275 which establishes a circuit from the transformer secondary 255 through leads 258, 259, 276, switch 275, leads 277 and 278, closed switch LS7, leads 279 and 280, main electric clutch coil 281 and leads 282, 264 and 265 back to the transformer secondary.

The start of the turret slide mechanism is effected by manual closing of the high speed clutch 66 which also closes a two-pole switch 285, 286 (Figure 16). Closing of the switch 286 establishes a circuit from the transformer secondary 255 through leads 258 and 259, switch 286, lead 290, normally closed switch 291 of LS6 and leads 292 and 293, and when the shaft 150 reaches such an angular position as to actuate switch LS1A, through this switch, through lead 294 to closed switch 295 of LS1B for the first turret position, lead 296, closed switch LS1C for the first turret position, leads 297 and 298, coil of the relay 4CR and leads 299, 300, 264, 265, back to the transformer secondary 255. Closing of the relay 4CR by the energization of its coil makes one contact and breaks two contacts. The switch 301 which is made by the closing of relay 4CR energizes the rapid traverse clutch 66 which starts the turret slide 35 for the first turret position forward at fast speed by fast rotation of the cam drum 30. This is done from lead 290 through the closed switch 301 of the relay 4CR, lead 302, solenoid 66 and leads 303, 282, 264 and 265 back to the transformer secondary 255. This fast motion of the tool slide continues, together with rotation of the shaft 155 driven thereby, until the first position lever 170 actuates the switch LS1C which opens a contact at 297 and closes a contact at 305. Breaking the contact at 297 deenergizes the relay 4CR which deenergizes the rapid traverse clutch solenoid 66 and automatically applies the brake 90 for a predetermined time, as is well understood in the art, to slow the rotation of the cam 30 to the feed speed. Closing of the contact 305 establishes a circuit which energizes the relay 11CR which closes an adjustable speed control for the slow speed motor 80. As shown the motor 80 is a variable speed direct current motor commercially known as a Thy-mo-trol motor which is made by the General Electric Company of Schenectady, New York, and in which the speed of rotation is controlled through electronic means by the adjustment of a potentiometer in a controlling circuit. This flow, in accordance with this invention, is controlled independently for each of the turret indexed positions by the setting of individual potentiometers for each index station 11VR to 15VR, respectively. These potentiometers may be set by individual knobs 310 shown on the forward face of the machine on Figure 1.

Closing of the contact at 305 closes a circuit from the lead 296 through closed switch 305, leads 311 and 312, coil of the relay 11CR, through leads 313, 300, 264 and 265 back to the transformer secondary 255. Closing of the relay 11CR closes three switches 314, 315, and 316. Closing of the switch 314 closes a controlling circuit for the motor 80 through the control box 256, allowing it to receive energy from the lines 252 and 253. Closing of this switch establishes a connection from the control terminal 320 through the closed switch 285, leads 321 and 3210, switch 314 of the relay 11CR and leads 322 and 323 back to the control box 256. Closing of the switches 315 and 316 closes the Thy-mo-trol motor speed control circuit from lead 324 through switch 315, lead 325, potentiometer 11VR, lead 326, switch 316, and lead 327 back to the control box 256. In order to indicate when the control circuit for relay 11CR is energized, a pilot light 328 is arranged in parallel with the coil of the relay 11CR so that it is lighted when relay 11CR is closed. The slow feed of the turret tool at index position #1 continues until the continued rotation of the shaft 155 causes actuation of the switch LS6 which opens the contact 291 at 292, thus deenergizing the relay 11CR. It also closes a contact at 330 between the leads 290 and 298 which action energizes the relay 4CR, which, as before noted, energizes the rapid travel clutch 66. The actuation of the switch LS6 takes place when the cam 30 is in such angular position that the turret tool is at its extreme forward limit, so that the rapid motion of the turret slide is now in retracting direction. Thus the turret tool is returned at high speed to its starting position. It will be noted that when the relay 4CR is deenergized, a switch 332 is closed which energizes the tool slide clutch 86, holding the slow feed speed of the motor 80 operative. The circuit for doing this is from the lead 290 through closing switch 332 of the relay 4CR, leads 333 and 334, tool slide clutch 86 and leads 303, 282, 264 and 265 back to the transformer secondary 255. The relay 4CR also when deenergized closes a switch 336 which energizes a time delay switch 337 which after a time delay closes a switch 338. This establishes such a condition that should the switch 275 be opened at this time, the mechanism will then be in slow feed through the closing of the switch 236 when the hand operated switch 275 is again closed.

When the drum 30 has turned to a position where the indexing arm 102 starts to index the turret, continued rotation of the drum indexes the turret and rotates the shaft 160 through one-fifth of a revolution, which allows the switch 295 to open and closes the switch LS2B. Opening of the switch 295 deenergizes the cross slide clutch 281 so that the cross slide operation stops. Closing of the switch LS2B establishes a circuit from the lead 290 through closed switch 291 of relay LS6, through lead 292 and 340, closed switch 341 of LS2B, which is closed when the turret is in the second index position, lead 342, switch 343 of LS2C, leads 344 and 298, coil of relay 4CR, leads 299, 300, 264 and 265 back to the transformer secondary 255. Closing of the relay 4CR starts rapid inward travel of the turret tool which is in position at this new or second indexed position of the turret, and the same cycle of fast and slow feeding speeds takes place as in the first indexed position of the turret. When LS2C is actuated at a predetermined angular position of the shaft 155, the shift is made from fast into feed speed at the rate determined by the setting of the potentiometer 12VR. This is done as follows. Actuation of the switch LS2C opens the contact at 343 which deenergizes the relay 4CR and closes the contact 345, establishing a circuit from the lead 342 through switch contact 345, leads 346 and 347, the coil of relay 12CR and leads 348, 300, 264, 265 back to the transformer secondary 255. Closing of the relay 12CR closes three switches 350, 351 and 352. Closing of the switch 350 connects leads 320 and 323 just as was done at the first index station by the closing of the switch 314. This starts the motor 80. Closing of the switches 351 and 352 connects leads 324 and 327 together through the potentiometer 12VR, the setting of this potentiometer determining the speed of the motor 80 for the second index position independently of the speed at any other index position. A pilot light 353 across the terminals of the relay 12CR will light when the relay is energized, showing to the operator when the tool slide at the second indexed position of the turret is moving at slow cutting speed.

Similarly the switch LS1A starts the rapid inward motion of the turret tool slide after the turret has been indexed to the third and fourth stations. The times when slow or working feed of the turret tool slide begins are controlled by the cam actuations of the switches LS3C and LS4C, respectively, and the speed of feed is controlled by the settings of the potentiometers 13VR and 14VR, respectively, the pilot lights 354 and 355, respectively, being lighted during slow feed at the index stations numbered 3 and 4. The indexing takes place automatically after the end working or turret tools have retracted to starting position as in the case of the turret tools at stations 1 and 2.

At station 5, however, the switch LS5A starts the fast motion advance of the turret tool, the shaft 160 being then in indexed position in which the switch LS5B is closed. Closing of the switch LS5A closes a circuit from the lead 293 through the switch LS5A, lead 370, closed switch LS5B, lead 371, switch LS5C, leads 372 and 298, coil of the relay 4CR and leads 299, 300, 264 and 265 back to the transformer secondary 255. Closing of the relay 4CR, as before noted, closes the rapid traverse clutch 66.

This continues until rotation of the shaft 155 actuates the switch LS5C, opening the connection between the leads 371 and 372 which deenergizes the relay 4CR, allowing the rapid traverse clutch 66 to open so that slow working traverse of the tool support starts. Actuation of the switch LS5C closes a circuit between the lead 371 and leads 375, 376, coil of the relay 15CR and lead 300 and also lights the pilot lamp 377. Closing of the relay 15CR causes slow motion of the motor 80 at a speed determined by the setting of the potentiometer 15VR.

When the shaft 150 has made a complete rotation which provides for a complete cycle of operations of the front and back cross slides 7 and 8, the switch LS7 is opened. This breaks the circuit to the cross slide clutches 281 so that the cam shaft stops. It remains stopped until the five indexed positions for the turret with the tools carried thereby have been completed and the turret returns to the first station. When this occurs, the shaft 160 completes one revolution and the switch LS1B is actuated by the cam thereon to close the lead 277 to the lead 280, the switch LS1B being in parallel with the switch LS7. This reestablishes the circuit for the cross slide clutch 281 and a complete new cycle of operations is started. It will be understood that in accordance with usual practice the stock in the work spindle will be fed forwardly and clamped for the start of a new cycle of operations, but since means for so doing is old and well known in the art and forms no part of the present invention, it is not described herein.

By adjusting the angular position about their supporting shafts 150 and 155 of the various levers 170, the timing of actuation of the several switches may be adjusted as desired. Should it be desired to skip any index position of the turret, it is only necessary to so adjust its control lever 170 on the shaft 155 that it does not actuate its switch until after the switch LS6 has made connection for energizing the relay 4CR. The turret tool actuating cam drum 30 will then continue in fast speed throughout its revolution and the turret will be indexed to the next position after the completion of the previous turret tool cycle.

From the foregoing description of an embodiment of this invention it will be evident to those skilled in the art that various changes and modifications may be made without departing from its spirit or scope.

I claim:

1. In combination, a rotary work spindle, an indexing tool-carrying turret mounted for rotation about an axis parallel and eccentric to said work spindle, a plurality of tool supports carried by said turret and arranged in circular array about said axis, means for indexing said turret to bring said tool supports successively into cooperative relation to said spindle, means for locking said turret in indexed position, a cam having a pair of spaced cam paths, a follower carried by each tool support for selective cooperation with either of said cam paths when said tool support reaches cooperative angular position by indexing of said turret, means located at one index station of said turret for moving said follower from one to another selected position in alinement with one or the other of said cam paths when said follower reaches cooperative relation thereto at a different index station of said turret, means holding said follower in said selected position until it reaches said different indexed station, means for rotating said cam to cause the tool support then in said different index station to move axially of said turret, and a second cam mounted for motion with said first mentioned cam, effective on said tool carrier only when said follower is being moved by one of said cam paths to move said locking means to rock said turret and cause a tool on said support to cut work carried by said spindle laterally of the spindle axis and while the tool is spaced from the outer end of the work.

2. In combination, a rotary work spindle, an indexing tool-carrying turret mounted for rotation about an axis parallel and eccentric to said work spindle, a plurality of tool supports carried by said turret and arranged in circular array about said axis, means for indexing said turret to bring said tool supports successively into cooperative relation to said spindle, means for locking said turret in indexed position, a cam having a pair of spaced cam paths, a follower carried by each tool support for selective cooperation with either of said cam paths when said tool support reaches cooperative angular position by indexing of said turret, means located at one index station of said turret for moving said follower from one to another selected position in alinement with one or the other of said cam paths when said follower reaches cooperative relation thereto at a different index station of said turret, means holding said follower in said selected position until it reaches said different indexed station, means for rotating said cam to cause the tool support then in said different index station to move axially of said turret, a second cam mounted for motion with said first mentioned cam, and means actuated by the indexing of said turret and by a follower positioned in one of said positions for moving a portion of said indexing means into cooperative relation to said second cam, said second cam having a cam path of a shape to be effective on said portion to move said locking means to rock said turret on its indexing axis while a tool carried by said tool support is in engagement with said work piece spaced inwardly from its outer end.

3. In combination, a rotary work spindle, a tool support movable toward and from work carried by said spindle and transverse to such motion, a cam having a pair of spaced cam paths, a follower carried by said tool support for selective cooperation with either of said cam paths, and a second cam having a cam path for cooperation with said follower when said follower is moved transversely out of cooperation with the cam paths of said first mentioned cam, said cam path of said second cam being shaped to transfer said follower out of alinement with one of said pair of cam paths and into alinement with the other of said pair of paths by actuation of said second cam, and means for actuating said second cam.

4. In combination, a rotary work spindle, tool carriers movable transverse to said spindle to present and retract tools carried thereby with reference to work carried by said spindles, means for so moving said carriers, a rotary shaft operatively connected to and movable with said carrier-moving means, control means angularly adjustable about the axis of said shaft, an indexing turret, a plurality of tool supports movably carried by said turret for successive presentation into cooperative relation to the work as said turret is indexed, means acting successively with each of said tool supports when such support is in such cooperative relation for moving said support toward and from the work, a second rotary shaft operatively connected to said support-moving means, control means angularly adjustable about the axis of said second rotary shaft, and actuating means for said carrier-moving means and support-moving means actuated in coordinated relation by said controlling means of both of said shafts.

5. In combination, a rotary work spindle, tool carriers movable transverse to said spindle to advance and retract tools carried by said carriers with reference to work carried by said spindle, means for rotating said spindle and for moving said carriers, an indexing turret, a plurality of tool supports movably carried by said turret for successive presentation into cooperative relation to the work piece carried by said spindle, a motor, connections from said motor to the tool support in operative position at any indexed position of said turret for advancing and retracting said support at a fast rate, connections from said motor to said turret for indexing said turret when said supports are retracted, a second motor, connections from said second motor to said support to advance said support in slow working speed, said spindle rotating means comprising a third motor, a shaft operatively connected to and rotatable in time with said indexing connections, a second shaft operatively connected to and rotatable with said first mentioned motor, and control means for said motors adjustable angularly about said shafts.

6. In combination, an indexing turret, a plurality of tool supports movably carried by said turret for successive presentation into cooperative relation to a work piece, a motor, connections from said motor to the tool support in operative position at any indexed position of said turret for advancing and retracting said support at a fast rate, connections from said motor to said turret for indexing said turret when said supports are retracted, a second motor, connections from said second motor to said support to advance said support at slow working speed, a shaft operatively connected to and rotatable in time with said indexing connection, a second shaft operatively connected to and rotatable with said first mentioned motor, and control means for said motors adjustable angularly about said shafts.

7. In combination, a rotary work spindle, a tool support movable toward and from work carried by said spindle, a cam having a pair of spaced cam paths, a follower carried by said tool support for selective cooperation with either of said cam paths, and means to engage the follower when said follower is not engaged by the first mentioned cam to move said follower into alinement with one of said spaced cam paths of the first mentioned cam.

References Cited in the file of this patent

UNITED STATES PATENTS

| | | |
|---|---|---|
| 725,438 | Gridley | Apr. 14, 1903 |
| 1,063,744 | Seward | June 3, 1913 |
| 1,567,790 | Drissner | Dec. 29, 1925 |
| 2,302,353 | Smith | Nov. 17, 1942 |
| 2,464,845 | Bodmer | Mar. 22, 1949 |
| 2,518,429 | Moorhead | Aug. 8, 1950 |
| 2,525,856 | Bodmer | Oct. 17, 1950 |
| 2,534,943 | Bergeson | Dec. 19, 1950 |
| 2,540,323 | Cross | Feb. 6, 1951 |